Oct. 15, 1957
J. B. GUINOTTE
2,809,465
FLY TRAP
Filed Jan. 31, 1955
2 Sheets-Sheet 1
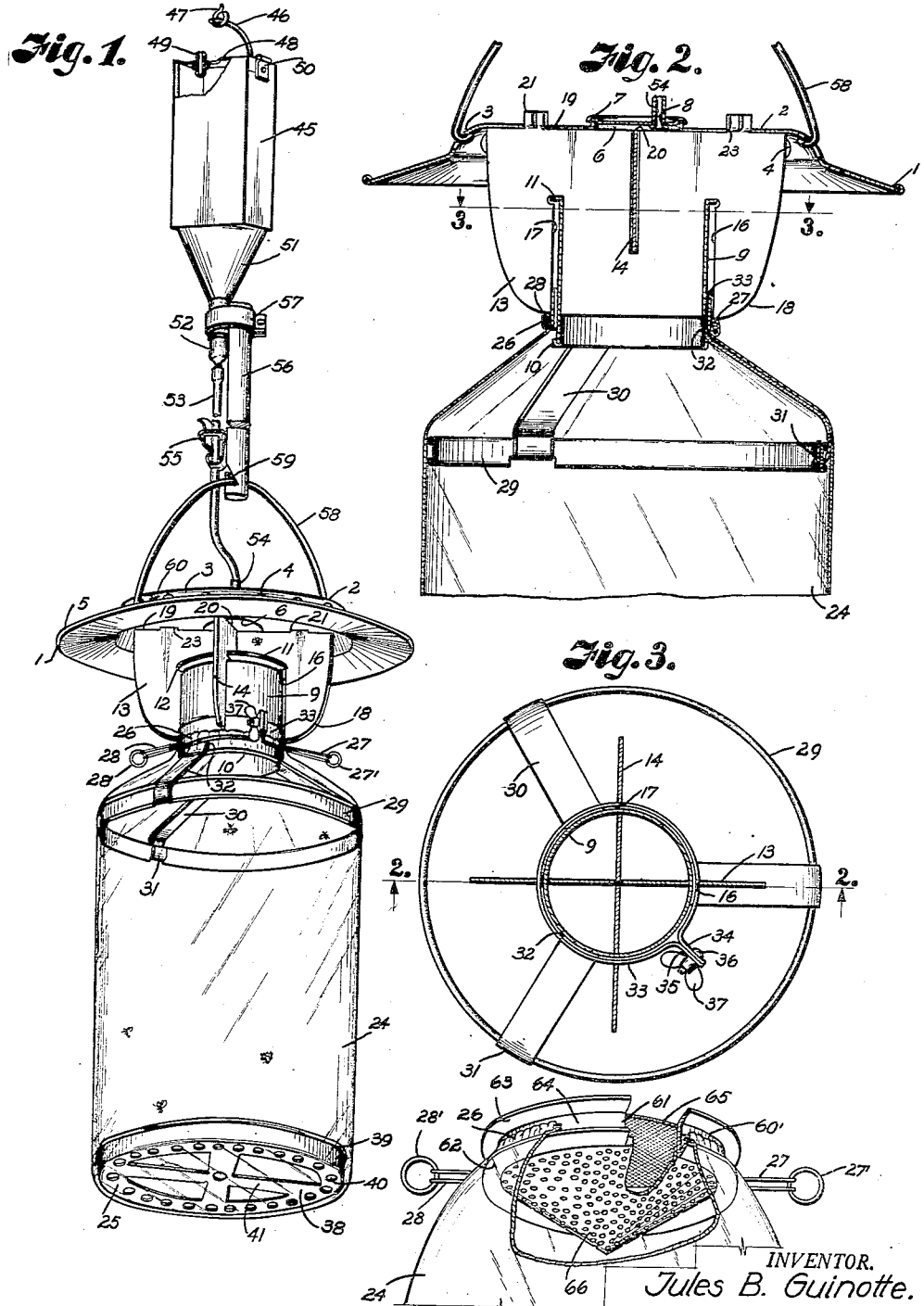
INVENTOR.
Jules B. Guinotte.
BY
Fishburn & Mullendore
ATTORNEYS.

Oct. 15, 1957     J. B. GUINOTTE     2,809,465
FLY TRAP

Filed Jan. 31, 1955     2 Sheets-Sheet 2

INVENTOR.
Jules B. Guinotte.
BY
ATTORNEYS.

United States Patent Office 2,809,465
Patented Oct. 15, 1957

2,809,465
FLY TRAP
Jules B. Guinotte, Tampa, Fla.
Application January 31, 1955, Serial No. 485,236
10 Claims. (Cl. 43—122)

This invention relates to fly traps and more particularly to fly traps having a disposable container for the flies which may be burned with the flies trapped therein or otherwise disposed of after it is filled.

It is well known that the handling of flies is very dangerous due to the many contagious diseases carried thereby and it is highly desirable to dispose of trapped flies without such flies coming in contact with the body and particularly the hands of the person in removing the bag from the traps and reclosing the same to prevent the flies or larvae from escaping therefrom.

Numerous traps have been devised all of which have been cumbersome, weighty or fragile and uneconomical, and due to the size of such traps are, therefore, not susceptible of easy transportation. Traps heretofore used have been so large in order to hold a satisfactory number of flies that it has been impractical to use the same in places where badly needed. No one has heretofore employed a bag of translucent material which would attract the flies and accomplish the purpose desired by applicant.

It is, therefore, the principal object of the present invention to provide a trap for flies wherein the flies will be contained in a disposable bag until the bag is substantially full and then burned within the bag or otherwise disposed of within the bag by the user.

Other objects of the present invention are to provide a trap for flies having a translucent bag held in distended and contoured shape with a lure or bait in the bottom thereof whereby air will circulate in and out of the bag to carry the scent of the bait to the flies thereby attracting the flies to the trap; to provide apparatus for fastening the bag to the trap proper in distended and contoured position; to provide means whereby the flies may enter the mouth of the bag; to provide for the provision of moisture through the trap in measured amounts depending upon the atmospheric conditions; to provide apparatus for the hanging of the bag framework structure which may be knocked down and shipped in a compact condition; to provide means for hanging of the trap and the container of the moisture for applying the same thereto; to provide screen means in the mouth of the bag for draining moisture therefrom by hanging the bag upside down so as to dry the flies before destroying; and to provide a device of this character which is simple, economical to manufacture and practical in operation.

In accomplishing these and other objects of the present invention, I have provided improved details of structure, the preferred forms of which are illustrated in the accompanying drawings, wherein:

Fig. 1 is a perspective view of my fly trap shown in hanging position.

Fig. 2 is a fragmentary, partly cross-sectional view of the diffuser housing and bracket for the upper portion of the bag.

Fig. 3 is a cross-sectional view taken on a line 3—3, Fig. 2.

Fig. 5 is a perspective view of a drainer for the mouth of the bag for dehydrating the flies trapped in the bag.

Figure 4:
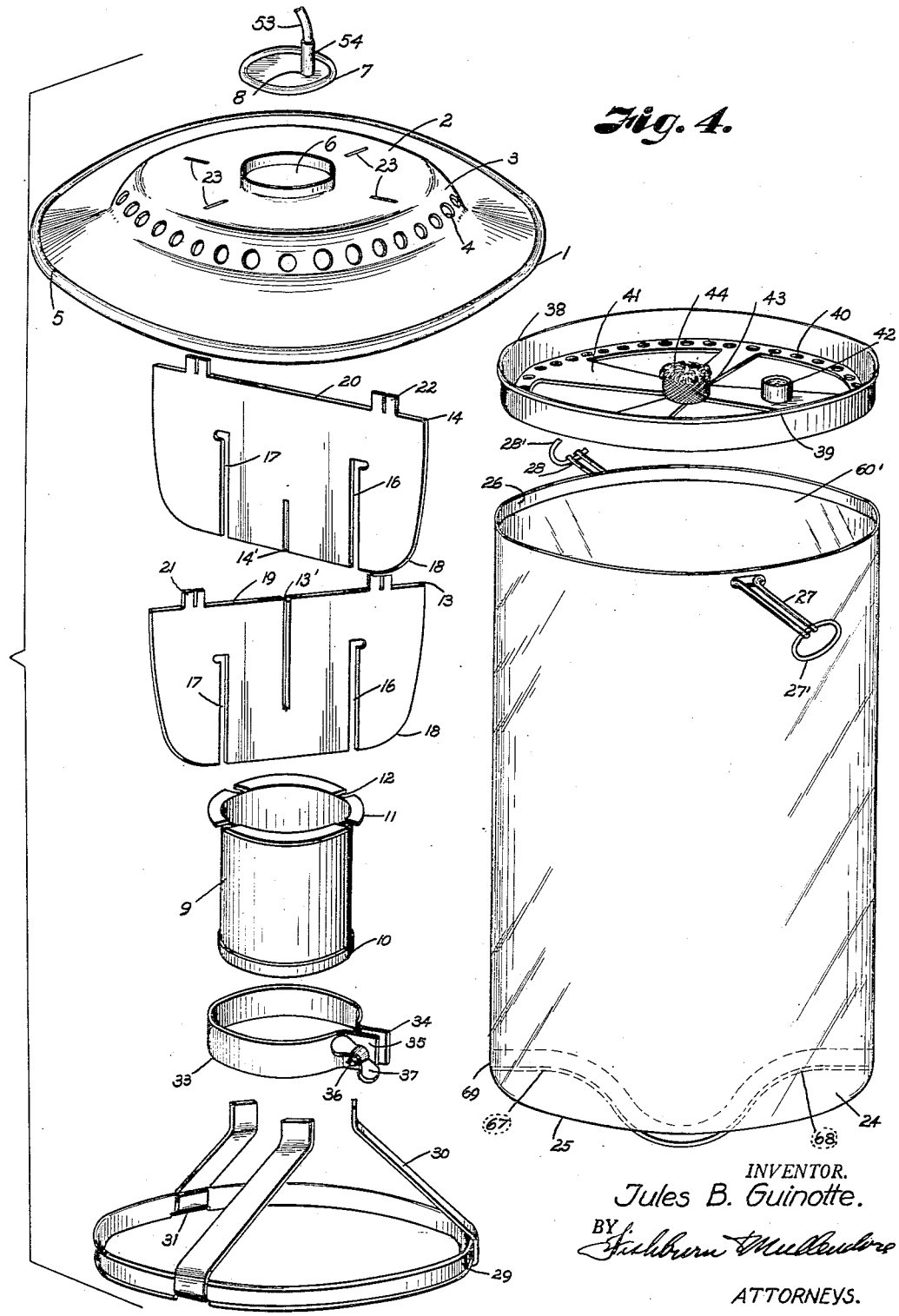
Fig. 4 is a perspective of the trap proper shown in disassembled relation.

Flies are sensitive to air currents surrounding any trapping device and are discouraged from entering traps by certain air movements. Flies when walking or crawling are deterred from entering traps by rough surfaces and projections and by any disturbance in the air currents, which disturbances are always present when an air current is disturbed by a rough surface over which the air is flowing. It is, therefore, necessary to provide a trap free of such structural defects. My trap is adaptable for luring of flies away from cattle, or cattle pens or barns, troop concentrations, both in feeding stations and latrines, or from human habitations.

Referring more in detail to the drawings:

1 designates a diffuser or housing having a raised center portion as indicated at 2 with curved or cambered sides 3 provided with a plurality of openings 4 with a flared skirt portion with the edge turned up as indicated at 5. The center of the top of the diffuser has an opening 6 adapted to receive a cap 7 having an opening 8 therein for a purpose later described.

9 designates a tubular member or housing having its lower end turned forming a flange or rib 10 having its upper end turned outwardly forming a rim or flange 11 and spaced around the rim or flange are a plurality of notches or recesses 12. A pair of vanes 13 and 14 are provided having slots 16 and 17 respectively for engaging the housing or tubular member. The slots are open at the bottom and the edges of the vanes are rounded slightly as indicated at 18 and the vanes extend above the tubular member a slight distance as illustrated in Fig. 2. The vane 13 is provided with a slot 13' at substantially the center thereof and open at the top and the vane 14 is provided with a slot 14' open at the bottom so that the two vanes are engaged together at the center. The vanes 13 and 14 are adapted to lie in a flat position side by side when the device is disassembled. The slots 16 and 17 are enlarged slightly at the upper extremities and adapted to engage the rim or flange 11 of the tubular member and lock the vanes thereon.

The upper edges 19 and 20 of the vanes 13 and 14 are provided with pairs of ears 21 and 22 which are adapted to be extended through slots 23 in the plane surface of the top of the diffuser and the ears bent over to retain the tubular member, vanes and diffuser together. The slots 23 are so positioned that the vanes 13 and 14 are at right angled position maintaining uniformity of passageways through the tubular housing 9.

24 designates a bag of translucent material such as polyethylene and is tubular in cross section having a circular or substantially flat bottom as indicated at 25. The bag has an open top provided with a loop 26 adapted to receive draw wires 27 and 28 having rings 27' and 28' on their respective ends to permit even pulling on the wires to assist in closing the bag and fastening same to the bottom of the housing 9 and also for opening the mouth for removing it with its contents and again closing the bag for retaining the contents therein for disposal.

In placing the bag over the bracket the draw wire and bracket forms the contour of the bag at the top to permit proper air flow in and out of the bag. When the bag is full of flies and larvae the draw wire permits opening of the top thereof equal to the diameter of the bottom of the bag and then the bag can be completely reclosed and locked with the wire to prevent escape of flies and larvae.

In order to attract the flies it is necessary that the bag be distended and contoured and held in that condition. I, therefore, provide a ring or circular member 29 having a plurality of brackets 30 with their lower ends turned forming loops 31 for engaging the ring 29 which may be readily attached to or detached therefrom. The brackets are graduated inwardly and then laterally upwardly to engage against the side of the tubular housing as indicated at 32. A band 33 is adapted to engage the vertical portions of the brackets and hold the same rigidly to the lower end of the tubular housing. The band 33 has outwardly extending ears 34 and 35 with openings adapted to receive a bolt 36 having a wing nut 37 for tightening the same thereon.

In order to hold the bag in extended and contoured position and provide a space for the bait or lure, I place a plate 38 in the bottom of the bag having side flanges rolled as indicated at 39 so as to not scratch or chafe the bag. The plate is provided with a plurality of perforations or openings 40 and has a plurality of arms 41 extending thereacross upon which the bait or lure may be placed as indicated at 42. I also provide on the plate 38 a cage 43 for a wad of cotton or the like 44 to retain the same in and hold the same thereon in unpressed condition for the retention of moisture in the bag applied from a source as later shown.

A container 45 for a suitable liquid attractor or bait such as sweetened liquid, is provided and here illustrated to be hung by a bail 46 from a support or the like 47. The container has a cover 48, provided with an air vent 49, hinged to the container as indicated at 50 and the bottom is cone-shaped as indicated at 51 ending in a tube 52 adapted to receive a flexible tube or the like 53 which has its other end engaging a tube 54 secured in the opening 8 in the cap 7 of the diffuser.

The length of the tube or the distance of the container of the liquid from the diffuser is important in that the gravity flow of the liquid will not be subjected to variations due to changes in atmospheric temperatures thus enabling the moisture to flow at a constant rate. A pressure clamp 55 is provided on the flexible hose having three positions of setting to allow for flow of liquid from the container according to atmospheric temperature, the nature of the liquid or the extra heavy influx of flies requiring more moisture.

I also provide a rod or the like 56 secured to the tubular portion of the container by a band or the like 57 and its lower end extends towards the diffuser. The diffuser is provided with a bail 58 and the rod is provided with a notch 59 adapted to receive the bail, the notch being graduated downwardly so as to retain the bail therein. The rod will provide rigidity to the structure and also accommodate the bail for the trap, as well as assuring a fixed gravity level of the liquid.

As stated above the device is adapted to be disassembled and packed in a compact condition for shipping. In assembling a device constructed as described the vanes 13 and 14 are placed on the tubular member or housing 9 for engagement of the slots in the notches in the rim 11 of the tubular member and then turned so that the vanes will engage such rim and lock the same thereon. The ears 21 and 22 are then inserted through the slots 23 in the top of the diffuser and bent over to hold the same in rigid position. The brackets 30 are then engaged on the circular member 29 and their upper ends secured to the lower end of a tubular member 9 by the band 33 and the wing nut 37 tightened on the band to hold the same rigidly thereto thus forming a bracket for the upper end of the bag. The plate 38 with the bait or lure 42 thereon and the cotton or the like 44 already being placed in the bottom of the bag, the bag is then straightened out to its full position and the mouth thereof engages over the bracket consisting of the circular member 29 and bracket arms 30 and the draw wires are drawn tight so that the mouth of the bag engages around the lower end of the tubular member 9 to secure and contour the upper portion of the bag as best illustrated in Fig. 1.

The liquid container is secured in a fixed position to the hanger rod and hung by the bail to a support and the lower end of the tube being secured to the lower end of the hanger rod and the tube being slightly longer than the rod so that it will hang in a straight line with its lower end already attached to the cap 7. The cap is pressed or snapped into the opening in the top of the diffuser and the device is ready for use.

It will be noted that the air will be directed by the vanes and diffuser and enters the tubular member 9 and will be directed downwardly into the bag and will flow out of the bag through the same tubular member due to currents of air passing through the bag because of the contour and shape of the bag diffusing the odors and thus carrying the fumes or scent from the bait to outside of the fly trap to lure the flies thereto. I have found that with proper bait and wind currents flies will be lured as far as three-quarters of a mile to the trap. The flies as indicated at 60 will enter the openings 4 in the curved or cambered side of the diffuser and crawl or walk along the vanes and underside of the diffuser and enter the top of the tubular member and then down into the bag. When the bag is filled or at least partially filled the bag may be loosened from the trap by loosening the draw wires 27 and 28 and a sufficient amount of larvae control or other chemicals placed in the bag so as to kill the larvae. The flies are dried so that they may be disposed of within the bag by burning or other means, and while the plate in the bottom will not burn it is not handled in any way and not intended for reuse.

I have found that by fastening the diffuser to the vanes in a rigid position it eliminates movement and tipping of the diffuser and thus prevent air circulation.

I have found that a translucent bag such as polyethylene or the like best suitable for this purpose and the bottom plate must be of sufficient rigidity to hold the bag in distended and contoured position, and the apertures allow displacement of air therethrough so that the liquid admitted to the bag will allow the plate to settle evenly.

While I do not wish to be limited to particular dimensions I have found that a diffuser of approximately nine inches in diameter with a ring for the upper portion of the bag of approximately six and one-fourth inches in diameter and the bottom plate of the same diameter; a tubular member of approximately two and one-half inches in length and two and one-fourth inches in diameter with vanes substantially five inches in width and approximately three inches in height to be best suitable for my purpose.

I have further found that an opaque bag such as paper will not be sufficient for my purpose for the reason that it will not allow sufficient light in the bag to attract the flies.

The cap 7 must be rust proof, such as aluminum or the like and as heretofore stated the vanes and housing must be substantially free from obstructions so as to not disturb air circulation or impede the crawl path of entering flies. The opening closed by the cap is necessary to look into the tube to determine if spiders, toads or other insects might have entered thereinto stopping up the tube and so that they may be removed.

I have found that approximately thirty ounces of liquid bait in the supply tank to be sufficient for operation of the trap until the bag is filled with flies. The cotton in the bottom of the bag will tend to retain the moisture and retard evaporation. The liquid contained is provided with a conical bottom to permit complete flow of liquid bait therefrom and avoid deposits and other residues occurring in a flat bottom container. It will be obvious that in a dry, low humid territory more moisture will be desired and the clamp on the flexible tube or valve on a metal tube be set accordingly. Where the humidity is higher the less moisture will be necessary and the control may thereby be set to such conditions. I have found that the liquid container, the hanger rod, the rubber or metal tubing, the clamp and bail when painted with high gloss enamel in either green or purple will prevent flies from clustering thereon rather than entering the trap as flies do not like a highly glossed surface of such color. The exterior of the trap head or diffuser should be of a semi-gloss white or semi-gloss grey and the vanes and undersurface of the diffuser and the interior of the tube and collars attached thereto should be a soft non-gloss finish in red of approximately the shade of red iron oxide, or a non-gloss black.

With a bag of substantially the same diameter as the ring or bracket upon which it is secured and of a length of approximately thirteen inches from the draw wire, I have found that it will catch and hold approximately 60,000 flies.

In Fig. 5 I have illustrated a device for inserting in the mouth or open top 60' of the bag 24 for draining of moisture therefrom before burning or other disposal.

The drainage device consists of a tube 61 having flanges 62 and 63 on its respective ends providing a channel 64 therebetween.

When the bag 24 is full of flies and ready for disposal, the wires 27 and 28 are loosened and the bag removed from the bracket ring 29. The lower flange 62 of the drainage device is inserted into the mouth 60' of the bag and the wires drawn taut to close the mouth in the channel 64. The flange 63 is slightly larger than the flange 62 and secured thereto by suitable means is a wire screen 65.

Secured to the bottom flange 62 is a cone-shaped perforated member 66 which extends into the bag 24 when in reverse position. Straps or strips 67 and 68 of the same material as the bag 24 are secured to the bottom edge 69 of the bag and crossed at the center and secured together at that point by suitable means to provide means for hanging the bag, in reverse position for draining, to a suitable support (not shown).

By use of this drainage means the necessity for use of a chemical or other substance for dehydrating the flies before burning is eliminated. In use the bag is merely removed from the bracket 29, the drainage member inserted in the mouth thereof, closed in the channel 64 by drawing the wires 27 and 28 taut and the bag may then be hung by the straps 67 and 68 for draining.

It will be obvious from the foregoing that I have provided an improved fly trap which may be shipped in a knocked-down condition in compact form and quickly and easily assembled without tools for use at desired places and when the bag is filled with flies or substantially filled it may be disengaged from the trap and again closed and disposed of without contact of the hands of the user with the interior of the bag and a new bag placed on the trap for use.

What I claim and desire to secure by Letters Patent is:

1. A trap for flies or the like adapted to be suspended from a support comprising, a tubular translucent bag, a diffuser, means for securing the diffuser to said support, a tubular housing, means securing the tubular housing to said diffuser with the top edge thereof spaced from the diffuser so that the flies may enter the top of said housing, a circular frame member secured to the lower end of the housing, said bag having an open top for engaging over the frame member and holding the bag in contoured position, draw means in the open top of the bag for securing same tightly to the lower end of the housing until the bag is filled with flies and whereby by loosening of the draw means the bag may be disengaged from the housing and the bag again closed for disposal, and means for supplying liquid bait in regulated amounts to said bag while the bag is attached to the housing.

2. A trap for flies or the like comprising, a tubular translucent bag, a diffuser having a flat top and a curved annular portion provided with a plurality of openings for entry of flies therethrough, said flat top having a central opening, a cap for said opening, means for securing the diffuser to said support, a housing, means securing the housing to said diffuser in spaced relation thereto, a circular frame member secured to the lower end of the housing, said bag having an open top for engaging over the frame member, means on said top of the bag for securing same to the lower end of the housing, means in the bottom of the bag for aiding in distending and contouring the bag, said diffuser including means for directing air through the housing into said bag and allowing the air to escape therefrom, a bait in said bag for luring the flies thereinto, a liquid bait container, a support for said container, a tube leading from the container to the opening in the cap disposed on the top of the diffuser whereby said liquid bait will be supplied through the housing to said bag, a rod connected to the container, and a bail secured to the diffuser and connecting with said rod for suspending said trap.

3. A trap for flies or the like adapted to be suspended from a support comprising, a tubular translucent bag, a diffuser having a flat top and a curved annular portion provided with a plurality of openings for entry of flies therethrough, said flat top having a central opening, a cap for said opening, means for securing the diffuser to said support, a housing, means securing the housing to said diffuser in spaced relation thereto, a circular frame member secured to the lower end of the housing, said bag having an open top for engaging over the frame member, means on said top of the bag for securing same to the lower end of the housing, means in the bottom of the bag for sliding in distending and contouring the bag, said diffuser including means for directing air through the housing into said bag and allowing the air to escape therefrom, a bait in said bag for luring the flies thereinto, a liquid bait container, a support for said container, a tube leading from the container to the opening in the cap disposed on the top of the diffuser whereby said liquid bait will be supplied through the housing to said bag, a rod connected to the container, and a bail secured to the diffuser and connecting with said rod for suspending said trap.

4. A trap for flies or the like adapted to be suspended from a support comprising, a tubular translucent bag having a mouth, a diffuser having a plane top having an opening therein for receiving a cover, said diffuser having an annular downwardly curved portion provided with a plurality of openings for flies to pass therethrough, means for securing the diffuser to said support, a tubular housing having flanges on its upper and lower ends, the upper flange having a plurality of spaced notches, vanes having slots at substantially their centers for interlocking the same together, said vanes having slots in their lower portions for engaging the notches in the upper flange of the housing and turned to engage said upper flange to hold the vanes on the housing, means on the top edge of the vanes for securing the vanes to said diffuser and the housing in spaced relation from the diffuser, a circular bracket member secured to the lower end of the housing, means securing the mouth of the bag to the lower end of the housing around the bracket, a perforated plate for the bottom of the bag for distending said bag, a bait on said plate, a liquid container having a lid and an air vent, said container having a conical bottom terminating in a tubular portion, a flexible tube secured to said tubular portion, a rod secured to said tubular portion of the container and having a slot near its lower end, a bail on said diffuser engaging in said slot in said rod, said cover for the opening in the diffuser having an opening therein, a short tube in said opening for receiving the lower end of the flexible tube for supplying liquid bait to said bag through the housing, and means on said tube for regulating supply of liquid bait therethrough.

5. A trap for flies or the like adapted to be suspended from a support comprising, a disposable translucent bag having a mouth, a tubular member, means securing the mouth of the bag to one end of the tubular member and holding the same in distended position, a diffuser, means securing the other end of said tubular member to said diffuser with the top edge thereof spaced from the diffuser so that the flies may enter the top of the tubular member,